(12) United States Patent
Springer et al.

(10) Patent No.: US 11,974,074 B2
(45) Date of Patent: Apr. 30, 2024

(54) PROVIDING OFF-THE-RECORD FUNCTIONALITY DURING VIRTUAL MEETINGS

(71) Applicant: Zoom Video Communications, Inc., San Jose, CA (US)

(72) Inventors: Shane P. Springer, Manchester, MI (US); Alexander Waibel, Seattle, WA (US)

(73) Assignee: Zoom Video Communications, Inc., San Jose, CA (US)

( * ) Notice: Subject to any disclaimer, the term of this patent is extended or adjusted under 35 U.S.C. 154(b) by 84 days.

(21) Appl. No.: 17/732,701

(22) Filed: Apr. 29, 2022

(65) Prior Publication Data

US 2023/0353708 A1 Nov. 2, 2023

(51) Int. Cl.
*H04N 7/15* (2006.01)
*H04L 12/18* (2006.01)

(52) U.S. Cl.
CPC ......... *H04N 7/155* (2013.01); *H04L 12/1822* (2013.01); *H04L 12/1831* (2013.01)

(58) Field of Classification Search
CPC .. H04N 7/155; H04L 12/1822; H04L 12/1831
USPC ....................................................... 348/14.08
See application file for complete search history.

(56) References Cited

U.S. PATENT DOCUMENTS

| | | | | |
|---|---|---|---|---|
| 5,786,814 | A * | 7/1998 | Moran | G06F 16/745 |
| 8,301,879 | B2 * | 10/2012 | Ramanathan | H04L 63/10 |
| | | | | 380/255 |
| 10,171,908 | B1 * | 1/2019 | Sinkov | G06F 40/169 |
| 11,334,618 | B1 * | 5/2022 | Adlersberg | G06F 3/0488 |
| 2003/0130016 | A1 * | 7/2003 | Matsuura | H04R 5/033 |
| | | | | 455/569.1 |
| 2008/0307105 | A1 * | 12/2008 | Sethi | H04N 7/15 |
| | | | | 709/231 |
| 2009/0306981 | A1 * | 12/2009 | Cromack | G06F 16/685 |
| | | | | 707/E17.103 |
| 2010/0053302 | A1 * | 3/2010 | Ivashin | H04N 7/147 |
| | | | | 348/14.08 |
| 2012/0274730 | A1 * | 11/2012 | Shanmukhadas | H04N 7/155 |
| | | | | 348/14.08 |

* cited by examiner

*Primary Examiner* — Binh Kien Tieu
(74) *Attorney, Agent, or Firm* — Kilpatrick Townsend & Stockton LLP

(57) ABSTRACT

A system for providing off-the-record functionality is provided herein. The system may include a processor configured to execute processor-executable instructions stored in non-transitory computer-readable medium to establish a video conference having a plurality of participants, each participant of the plurality of participants exchanging a plurality of audio or video streams via the video conference. The processor may also be configured to receive, from a first client device associated with one of the plurality of participants, a first audio stream or a first video stream of the plurality of audio or video streams, and record the plurality of audio or video streams within a recording. The processor may also be configured to receive an off-the-record request to begin an off-the-record time period, and in response to the off-the-record request, prevent at least one of the first audio stream or the first video stream from being included in the recording.

20 Claims, 9 Drawing Sheets

PROVIDING OFF-THE-RECORD FUNCTIONALITY DURING VIRTUAL MEETINGS

FIELD

The present application generally relates to videoconferences and more particularly relates to systems and methods for providing off-the-record functionality during virtual meetings.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
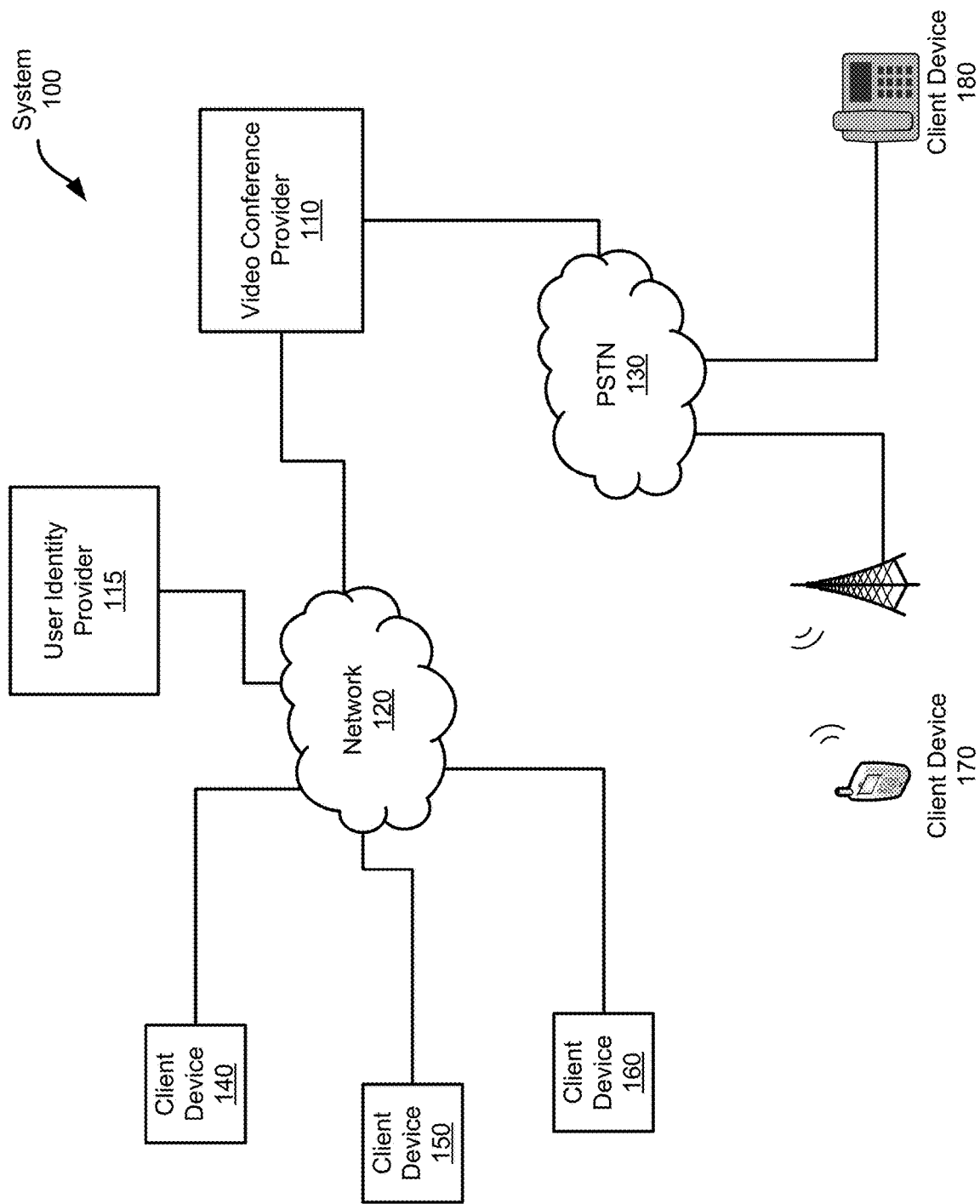
FIGS. 1, 2, and 3 show example systems for providing off-the-record functionality during virtual meetings, according to an embodiment herein.

Examples are described herein in the context of systems and methods for providing off-the-record functionality during virtual meetings. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conference providers can enable people to interact with each other using their own computers (or "client devices") with both video and audio in a variety of settings, such as in one-on-one conversations, group meetings, and webinars. While each of these types of settings can allow people to interact with each other, they can differ in character. For example, one-on-one conversations include only two people and may involve only a small amount of data being transmitted between the two client devices. Group meetings may involve a larger number of people all interacting with each other. In contrast, webinars typically involve a group of people that are attending to hear presentations from one or more presenters. Thus, in a webinar, interaction tends to be mostly one-way: from the presenter(s) to the audience. In addition, webinars can have very large numbers of participants, potentially numbering in the thousands or tens of thousands.

As the popularity of virtual meetings to replace conventional, in-person meetings, continues to rise, so too does the increase in privacy concerns for participants while in the virtual space. While participating in virtual meetings, participants generally have little control over their privacy, especially if a virtual meeting is being recorded. Conventionally, if a participant wants to join a virtual meeting that is being recorded, the participant must either consent to being recorded, by both audio streams and video streams, or leave the virtual meeting. In some circumstances, a participant may join a recorded meeting without video and choose to not speak during the meeting, but the participant's personal information regarding his or her attendance is still associated with the recording. Moreover, attending the meeting in this manner diminishes the virtual meeting for the participant and leads to a less meaningful experience. Accordingly, there is a need for allowing participants to attend a recorded meeting while maintaining control over their privacy.

To provide virtual meeting participants with control over their personal privacy during a recorded meeting, systems and methods are provided herein for providing off-the-record functionality during virtual meetings. Off-the-record functionality during a virtual meeting can allow a participant to share content (e.g., audible or visual) without the content being recorded. For example, if a participant would like to share private information during a recorded virtual meeting, the participant can request to be "off-the-record." In response to the off-the-record request, recording of the participant's audio and video streams may be terminated. The participant's audio and video streams, however, continue to be transmitted to the other participants in the virtual meeting, thereby allowing sharing of the private content with the other meeting participants. When the participant is finished sharing the private content, the participant can provide an indication that the off-the-record time has ended and recording of the participant's audio and video streams may resume. The recording does not include the participant's audio and video streams during the off-the-record time period, thereby providing the ultimate confidence and assurance to participants that the off-the-record content remains confidential and private.

In some embodiments, the participant may inadvertently share private content during a recorded virtual meeting. The systems and methods for providing an off-the-record button may allow the participant to retroactively remove the shared private content from the recording. For example, after realizing that the private content was shared during the recording, the participant may provide an "off-the-record" request, indicating a time period for the off-the-record request. The off-the-record time period may correspond to the recording time at which the private content was shared. In response to the off-the-record request, the audio and video streams from the participant may be erased from the recording during the off-the-record time.

The off-the-record functionality provided herein can allow a participant the confidence and security to share content during a virtual meeting without concerns of being recorded. The off-the-record functionality may allow for an enhanced virtual experience for a participant, providing the participant with control over his or her personal and private information during a recorded virtual meeting.

This illustrative example is given to introduce the reader to the general subject matter discussed herein and the disclosure is not limited to this example. The following sections describe various additional non-limiting examples and examples of systems and methods for providing an off-the-record button during a virtual meeting.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
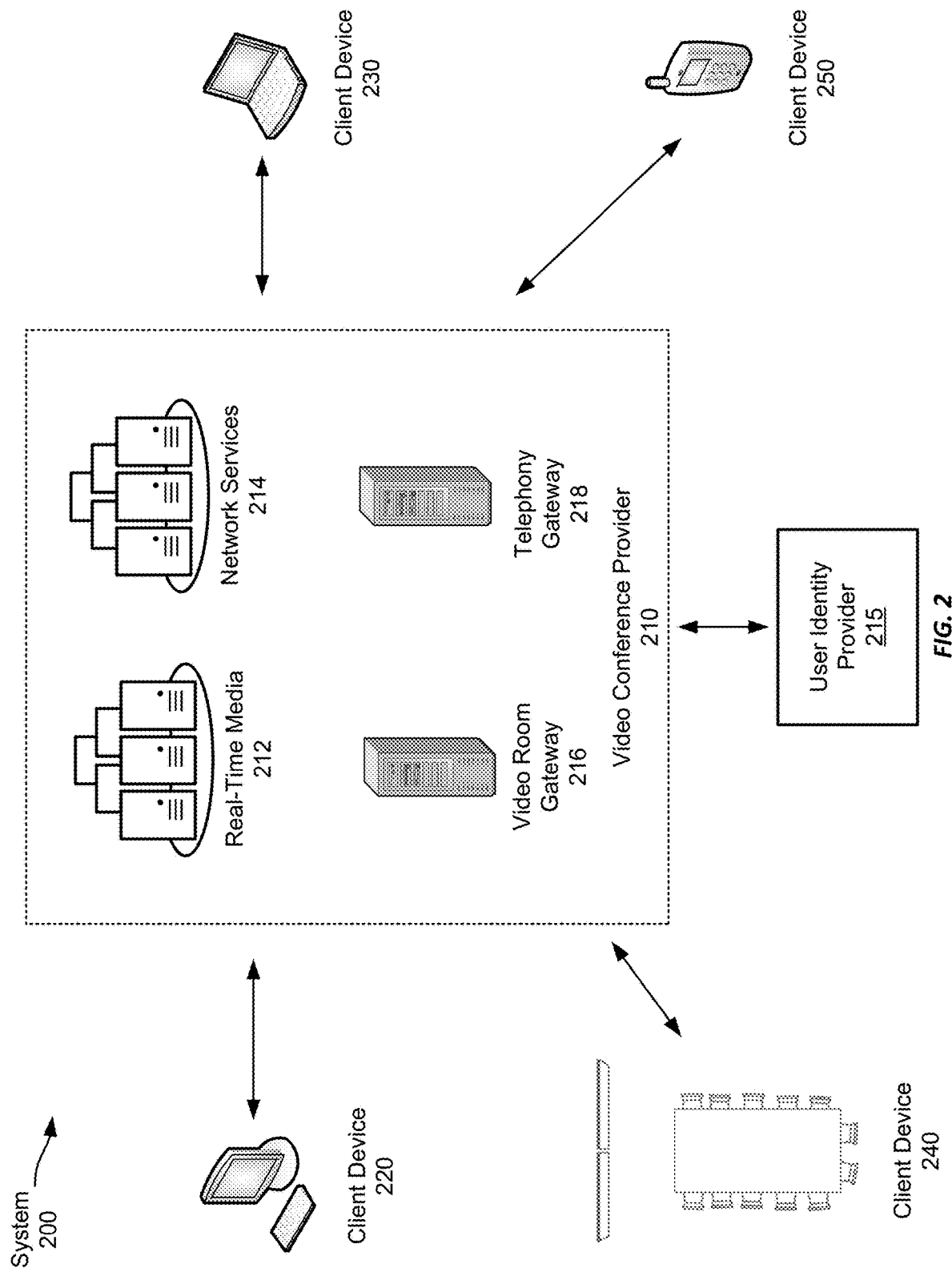

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different Examples of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214. For example, if a host wishes to remove a user from a meeting, they may identify the user and issue a command through a user interface on their client device. The command may be sent to a network services server 214, which may then disconnect the identified user from the corresponding real-time media server 212.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
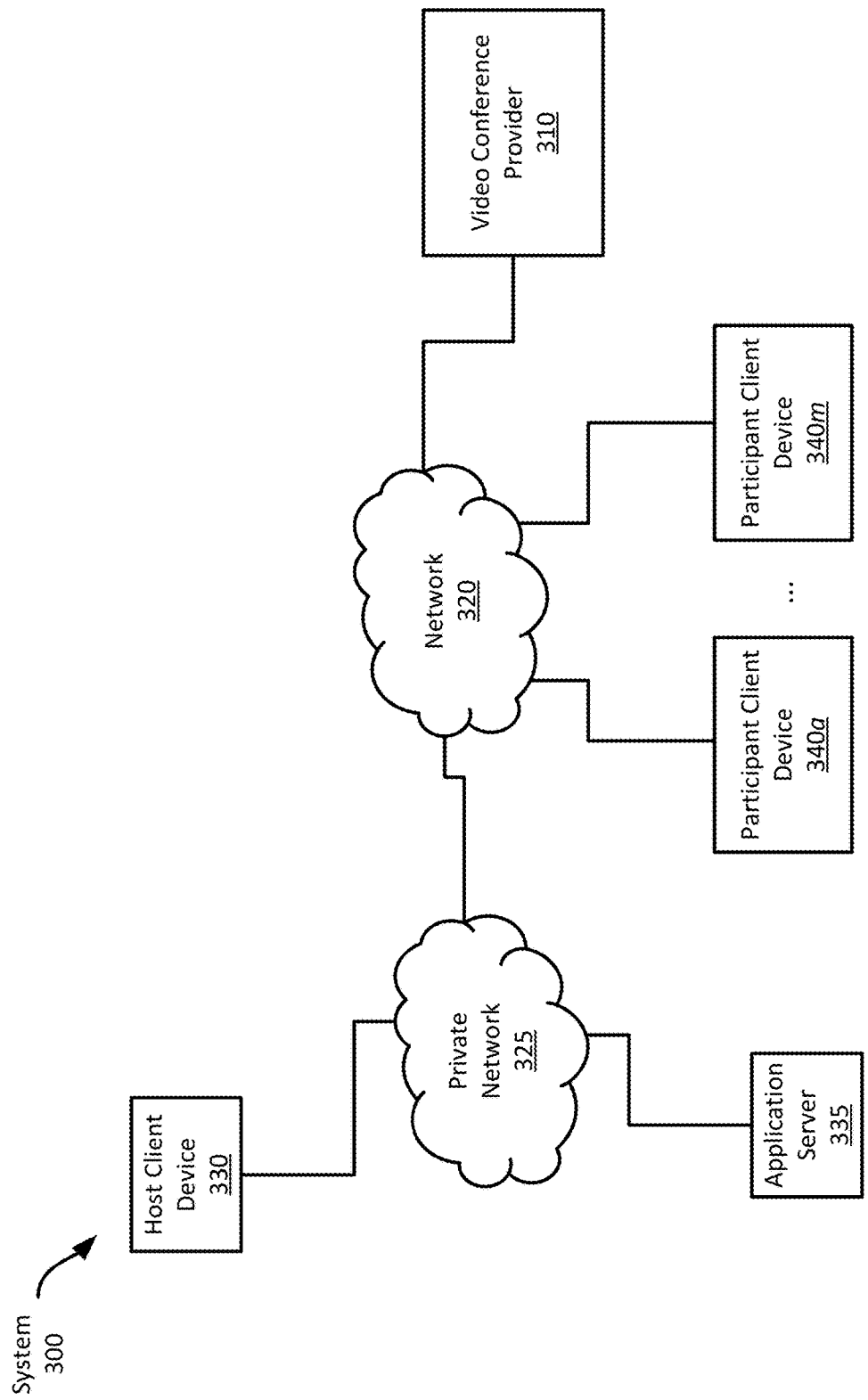

Referring now to FIG. 3, FIG. 3 shows an example system 300 for providing off-the-record functionality during a virtual meeting. In this example, a video conference provider 310 provides video conference services to multiple different client devices 330 and 340*a-m*, generally as described above with respect to FIGS. 1 and 2. In this example, the client devices 330 and 340*a-m* participate in a meeting hosted by the video conference provider 310. Client devices 340*a-m* connect to the video conference provider 310 over a public network 320, e.g., the internet; however, host client device 330 participates from within a private network 325, such as from their office at work. In addition to the host client device 330, an application server 335 is connected to the private network and makes various business applications available to the host client device 330. In different examples, these business applications may vary; however, in this example, the application server 335 provides applications to access business databases and files. To access these various resources, the host client device 330 has different client applications installed on it and may also have web applications accessible via a web browser, which may be stored as bookmarks in the web browser.

To start a meeting, the host client device 330 connects to the video conference provider 310 and begins a virtual meeting ("meeting") at the video conference provider 310, such as by beginning a scheduled meeting, generally as described above with respect to FIGS. 1 and 2. The video conference provider 310 may create and manage the meeting as discussed above.

Once the virtual meeting is started, participants may be able to interact with other participants and see their respective names, such as in close proximity to other participants' video streams or in a list of participants visible in a graphical user interface ("GUI"). In some embodiments, the participants may only be able to see information, e.g., names or video feeds, from the host(s) of the meeting or certain select participants that will be engaged in discussions during the virtual meeting, such as panelists in a panel discussion. Still other limits may be imposed on the various participants, such as their ability to react to occurrences during the meeting, e.g., participants may be allowed to interact with their GUI to raise their hand to ask a question, but may not be allowed to provide any other feedback.

During the meeting one of the participant client devices 340*a-m* or the host client device 330 may request to record the meeting. The request to record the meeting may be transmitted to the video conference provider 310. In some embodiments, the video conference provider 310 may prompt the non-requesting client devices with a notification that the meeting is going to be recorded. For example, if the host client device 330 request to record the meeting, the participant client devices 340*a-m* may receive a notification that the meeting is going to be recorded. Once the meeting request is accepted, the video conference provider 310 may record the audio and video streams from all of the client devices, 340a-m and 330, until the recording is terminated or the meeting is ended.

As noted above, under the conventional virtual meeting recording architectures, participants need to either accept being recorded or leave the meeting. That is, presently, if a meeting is being recorded the audio and video streams from a client device, such as the participant client devices 340a-m, are recorded regardless if the respective participant wants to be recorded if the participant stays in the meeting. Currently, there is no way for the participant to join and participate in a virtual meeting that is being recorded without his or her audio and video streams being recorded as well.

To provide virtual meeting participants the ability to join and participate in a recorded meeting without being recorded themselves at all times, an off-the-record button for virtual meetings is provided herein. The off-the-record button may provide participants the option to select various time frames or periods during a recorded meeting for his or her audio stream, video stream, or both audio and video streams to be "off-the-record." For example, a participant corresponding to the participant client device 340a, may want to share confidential information with a coworker corresponding to participant client device 340b during a virtual meeting. The meeting, however, is being recorded for training and educational purposes. As such, the participant may want the sharing of the confidential information with the coworker to remain "off-the-record." Thus, prior to sharing the confidential information, the participant may request to go "off-the-record." The off-the-record request may be transmitted from the participant client device 340a to the video conference provider 310. Once the video conference provider 310 receives the off-the-record request, the video conference provider 310 may terminate recording of the audio and video streams from the participant client device 340a. At this time, the participant client device 340a is considered to be "off-the-record."

It should be understood that in some embodiments, off-the-record may include termination of recording of the audio stream, of the video stream, or both the audio and video streams. In other embodiments, off-the-record may include termination of recording of the audio and/or video streams of the requesting client device, such as the participant client device 340a, or may include termination of recording of all audio and/or video streams for all of the meeting participants. In still further embodiments, off-the-record may also include not recording all non-audio or video content. For example, during an off-the-record duration, any chat messages or documents exchanged may not be recorded as well.

In some embodiments, the other participants in the virtual meeting may be notified or informed when the meeting transitions to off-the-record. For example, when the participant client device 340a requests to be off-the-record, the participant client devices 340b-m and the host client device 330 may receive an indication or be otherwise notified that the recording is paused and/or the meeting is off-the-record.

In some embodiments, the host client device 330 may need to approval an off-the-record request before a participant can go "off-the-record." For example, the participant client device 340a may request to be off-the-record. The off-the-record request may be transmitted to the host client device 330 via the video conference provider 310. The host client device 330 may receive the off-the-record request and may approve or deny the request. In some embodiments, the host client device 330 may modify the off-the-record request before approving it. For example, the participant client device 340a may request to be off-the-record for the duration of the meeting, but the host client device 330 may modify the request and approve the participant client device 340a to be off-the-record only during the main portion of the virtual meeting.

When the meeting is off-the-record, the meeting participants may continue to exchange audio and video streams. Because the meeting is not recorded during the off-the-record time period, any content exchanged between participants remains unrecorded, which is the same behavior as if the meeting was not being recorded in the first place. When the participant has completed sharing the confidential information, the participant, via the participant client device 340a, may transmit to the video conference provider 310 an indication to return to recording. Upon receipt of the indication that the off-the-record time period is completed, the video conference provider 310 may resume recording of the audio and video streams.

Importantly, because the off-the-record time is meant to be a pause in recording of the virtual meeting, regardless of how many off-the-record time periods there are during a virtual meeting, a single recording may be generated upon termination of the meeting and/or the overall recording. In some embodiments, the recording may simply have a break in the recording during off-the-record time periods, while in other embodiments, there may be an indication on the recording of the off-the-record time period.

Figure 4:
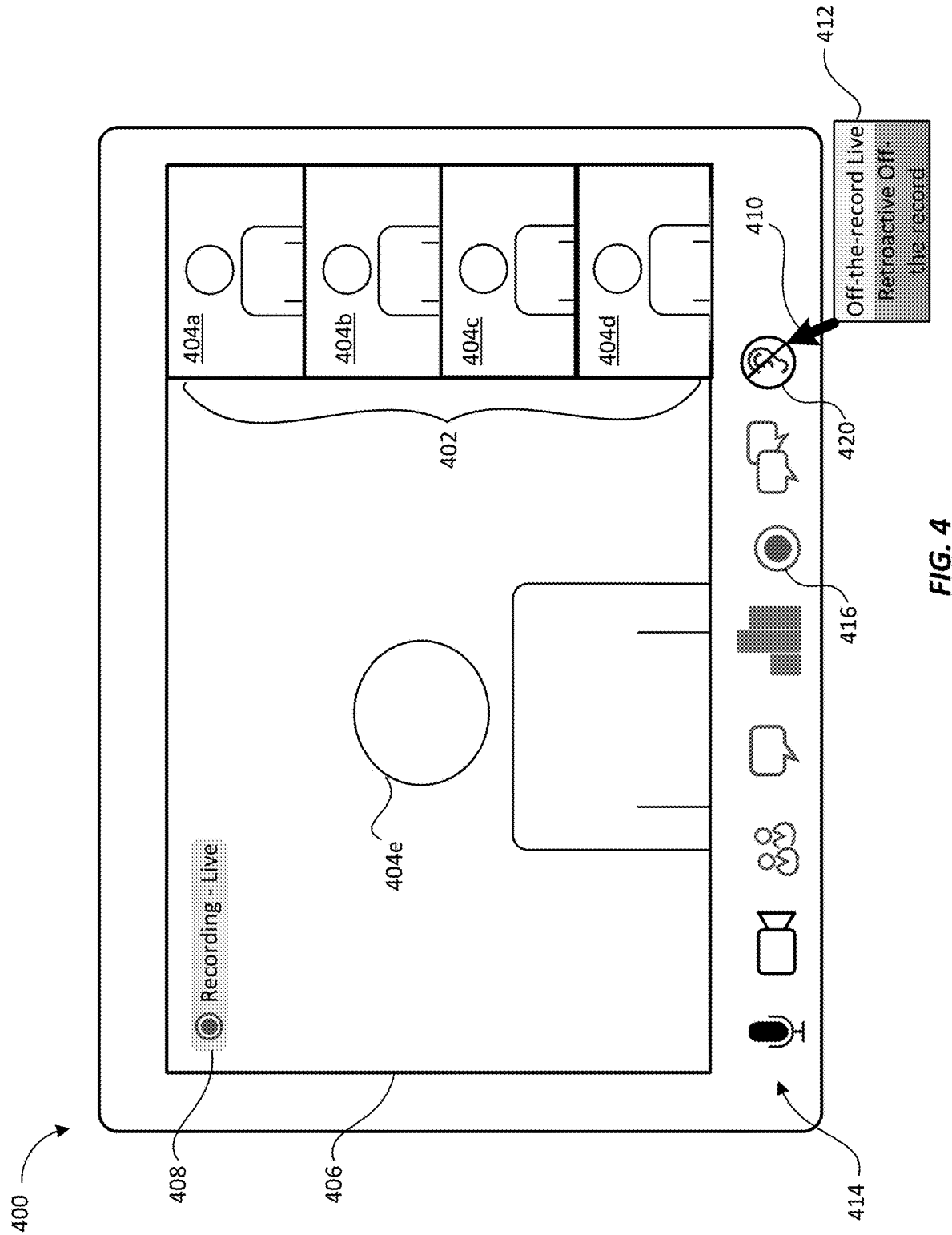
FIG. 4 shows a graphical user interface during a virtual meeting being recorded, according to an embodiment herein.

Referring now to FIG. 4, a graphical user interface (GUI) 400 during a virtual meeting being recorded is provided, according to an embodiment herein. The GUI 400 may be presented to a participant or a host during a virtual meeting. The following figures and related components, such as GUI 400 of FIG. 4, will be described with respect to the system shown in FIG. 3, however, any suitable system according to this disclosure may be employed, such as those described in FIGS. 1 and 2.

In some embodiments, a GUI 400 is viewable to a participant of the video conference on the participant's device, for example the GUI 400 may be viewable to participant A on the client device 340a. Presentation of the GUI 400 on the participant's device may be in response to the initiation of the virtual meeting.

The GUI 400 may include a roster 402 of the participants 404a-e in the video conference. The roster 402 may include a video stream of some or all of the participants 404a-e. In other embodiments, the roster 402 may include a picture, image, representation, avatar or a listing of some or all of the participants 404a-e who have joined the virtual meeting. When a participant joins the video conference, the joining participant is added to the roster 402.

Once the virtual meeting is initiated, video and audio streams may be exchanged between the participants 404a-e. Display 406 may display the video stream of a currently speaking participant 404e. The audio stream from participant 404e may also be transmitted along with the video stream. In some embodiments, more than one participant may be speaking, and in such cases, the display 406 may include two or more windows providing the video streams from the speaking participants. In an example embodiment, even participants who remain silent during the meeting may have their video streams recorded. In such cases, display 406 may include the video streams of the silent participants. For example, roster 402 may include the recorded video streams of the silent participants.

The GUI 400 may also include a dashboard 414 containing one or more action selections. For example, the dashboard 414 may include a recording selection 416 that allows a participant to record the streams of audio and video during the video conference. To initiate recording of the virtual meeting, a participant may select the recording selection 416. The recording selection 416 may transmit a recording request to the video conference provider 310, which may transmit a notification or request to the other meeting participants, as noted above. If the recording request is accepted, then the meeting may be recorded. Upon recording, an indication 408 may be provided to indicate to the participants 404*a-e* that they are being recorded. The indication 408 may be helpful for the participants 404*a-e* to know that their audio and video streams are being recorded.

At some time after the virtual meeting is initiated, one or more of the participants 404*a-e* may wish to share content "off-the-record." For example, the participant 404*a* may wish to share personal information with the other participants of the virtual meeting. Due to the personal nature of the information, the participant 404*a* may not want the information to be recorded and potentially shared with people out of their control.

To initiate an off-the-record time period, the participant 404*a* may transmit an off-the-record request to the video conference provider 310. As illustrated, the dashboard 414 may include an off-the-record selection or button 420. In an example embodiment, the participant 404*a* may select the off-the-record selection 420 with his or her cursor 410. Upon selection of the off-the-record selection 420, the participant 404*a* may be prompted by prompt 412 to specify a type of off-the-record time period. As illustrated, the prompt 412 may provide one or more options for various off-the-record time periods. For example, in one embodiment, the prompt 412 may provide an off-the-record live option and a retroactive off-the-record option.

The off-the-record live option may initiate an off-the-record time period upon selection by the user. For example, when the participant 404*a* selects the off-the-record live option on prompt 412, the video conference provider 310 may stop or pause recording the audio and video streams from the meeting. As noted above, in some embodiments, only recording of the audio and video streams corresponding to the participant 404*a* may be paused or stopped. The recording will remain paused until the participant 404*a* indicates that the off-the-record time period is complete. To indicate that the off-the-record time period is completed, the participant 404*a* may reselect the off-the-record selection 420. In some embodiments, another meeting participant, such as the host, may reinitiate recording. For example, the participant 404*a* may share the personal content and then return to the meeting topic without remembering to restart the recording. In such embodiments, another participant and/or the host may be able to restart the recording.

The retroactive off-the-record option may allow a participant to remove content from the recording retroactively. For example, if the participant 404*a* shared the personal information before requesting to be off-the-record, the participant 404*a* could select the retroactive off-the-record option to remove the sharing of the personal information from the recording. By selecting the retroactive off-the-record option, the participant 404*a* may be able to specify a time duration for when to remove the content from the recording. For example, the participant 404*a* may select to remove the audio and video streams from the previous 5 minutes to cover the time in which the personal information was shared. In response to the retroactive off-the-record selection, the video conference provider 310 may erase the audio and video streams from the recording such that the identified previous 5 minutes correspond to an off-the-record time period. Retroactive off-the-record requests may have to be approved by the meeting host before those portions of the recording are deleted. Typically, retroactive off-the-record requests would need to be submitted before the meeting ends (or shortly thereafter) to guarantee that those portions of the recording are deleted prior to the full recording being shared with others.

In some embodiments, upon selecting the retroactive off-the-record option the participant 404*a* may be prompted with a quick replay of the recording up until the off-the-record request. Using the prompt, the participant 404*a* can review and identify the exact timing at which the participant 404*a* wishes to make the meeting off-the-record and/or specify the off-the-record time period.

In some embodiments, when the participant 404*a* selects the off-the-record selection 420, an indication that the participant 404*a* is off-the-record may be provided (not shown). For example, the participant 404*a*'s video stream may be modified such to replace his or her video stream with an avatar or badge. In embodiments where the participant 404*a* is attending the virtual meeting via audio only, a badge or notification may be provided next to his or her name on the roster 402. The indication that a participant is off-the-record may be present in the meeting recording, whether the off-the-record functionality is prompted live or retroactively.

Figure 5:
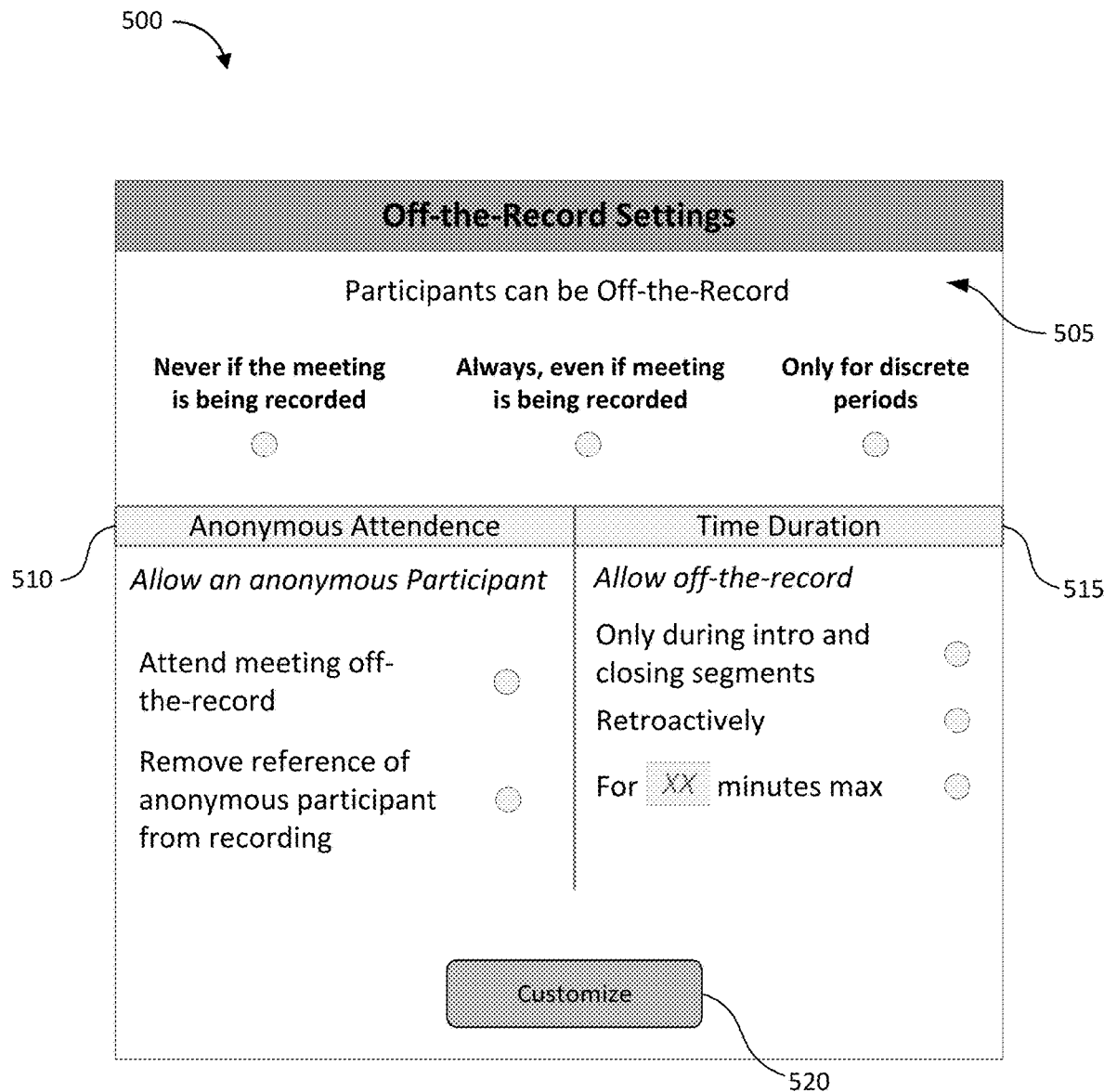
FIG. 5 illustrates an off-the-record settings prompt, according to an embodiment herein.

Referring now to FIG. 5, an off-the-record settings prompt 500 is provided, according to an embodiment herein. The following figures and related components, such as the prompt 500 of FIG. 5, will be described with respect to the systems shown in FIGS. 3 and 4, however, any suitable system according to this disclosure may be employed, such as those described in FIGS. 1 and 2.

The off-the-record settings prompt 500 may be provided to a host or coordinator of a virtual meeting. For example, the off-the-record settings prompt 500 may be provided to the host client device 330 when the host prepares the meeting invitation. As shown, the off-the-record settings prompt 500 may provide various off-the-record options that the host can set. In some embodiments, the off-the-record settings prompt 500 may include a pane 505. As shown by pane 505, the host may set the level or degree to which the meeting participants can be off-the-record. For example, the host may select the option to never allow participants to be off-the-record if the meeting is being recorded (for example, for meetings that must be recorded according to regulations). If the host selects this option, then the participants, such as the participant 404*a*, even when selecting the off-the-record button, such as the off-the-record selection 420, may be unable to go off-the-record. In such cases, when the participant 404*a* selects the off-the-record selection 420, the participant 404*a* may receive a prompt on the display 406 indicating that the participant 404*a* cannot go off-the-record or that the off-the-record option is not enabled for this meeting.

As shown by the pane 505, the host may select the opposite option of always allowing participants to go off-the-record, even when the meeting is being recorded. In some embodiments, this option may allow participants to go off-the-record for any duration of time. For example, the participant 404*a* may select the off-the-record selection 420 at any point during the virtual meeting and remain off the record until the off-the-record selection 420 is selected again. In such cases, the video conference provider 310 may not record only the audio and video streams corresponding to the participant 404*a*'s device, while continuing to record the audio and video streams from the remaining meeting participants (e.g., the participants 404*b-e*).

A final option provided by the pane 505 is an option that allows participants to go off-the-record for discrete periods of time. For example, if the host selects the option for "only for discrete periods," the host may be prompted to specify a maximum time period that a participant can go off-the-record. For example, the host may set a 5 minute maximum time period for which a participant can be off-the-record. Once the maximum time period is met, the participant may be notified and the recording may restart.

In some embodiments, the prompt 500 may include anonymous attendance settings 510. The anonymous attendance settings 510 may provide various options to allow a participant to attend the meeting off-the-record. If the host selects this option and allows participants to attend the meeting off-the-record, then upon joining the meeting, the participant may be provided the option to join off-the-record (e.g., anonymously) or to join normally (e.g., as his or her self). In an example embodiment, if the participant 404a joins the meeting off-the-record, then the audio and video streams from the participant 404a's client device may not be recorded, regardless of whether the meeting itself is recorded. Instead, the audio and video streams from the participants who are attending the meeting normally will be recorded. If the participant 404a, as joined off-the-record, participates in the meeting (e.g., talks or provides other visual gestures), the other participants can see and hear the participant 404a. The audio and/or video streams from the participant 404a, however, will not be captured by the recording.

In still other embodiments, the host may allow participants to attend the meeting off-the-record and even remove any reference of the participant from the recording. For example, while the participant 404a may attend the meeting off-the-record, the other participants may still speak to the participant 404a, such as by addressing the participant 404a by his or her name or stating other personally identifiable information (e.g., job title, location, address). If the participant 404a wishes to remain truly anonymous in the meeting recording, the participant 404a can request to remove any reference to his or herself from the recording, if the host allows it. If allowed by the host and requested by the participant 404a, the video conference provider 310 may remove any content referencing the participant 404a from the recording. For example, speech recognition of the audio streams from the meeting may be performed to identify keywords associated with the participants, such as personally identifiable information. Speech recognition of the audio streams is described in greater detail below with respect to FIG. 6.

As noted above, the host may set a time duration for an off-the-record time period. The prompt 500 may include time duration settings 515. The time duration settings 515 may allow the host to select only certain times during the meeting at which the off-the-record option is enabled. For example, if the host selects that the participants can only be off-the-record during discrete time periods, then the host can specify in the time duration settings 515 that the participants can only be off-the-record during the intro and closing segments of the meeting. This may allow participants to freely engage in small talk during the beginning and end of the meeting without being recorded. As can be understood, small talk at the beginning and ending of meetings may not be pertinent to the content of the meeting and is irrelevant to the primary content of a recording. Thus, the host may determine it acceptable for participants to be off-the-record only during these times.

In other embodiments, the time duration settings 515 may also provide the host the option to allow retroactive off-the-record time periods. As discussed above, the retroactive off-the-record option allows a participant to retroactively identify a time period as off-the-record, thereby retroactively removing the content from the recording. There may be scenarios in which retroactive removal of content from the recording is undesirable and as such the host may determine to not allow it. In other scenarios, the host may allow retroactive off-the-record to provide participants the option to fully participate in the meeting without concern of being recorded. In such cases, the host may be able to set a maximum amount of time for which a participant can retroactively make a time period off-the-record. In some embodiments, the maximum retroactive off-the-record time period may be the same as the maximum off-the-record live time period. In other embodiments, the maximum time period for a retroactive off-the-record option may be different from the off-the-record live time period.

In some embodiments, there may be no maximum time period or the maximum time period may cover the entirety of the meeting. In such cases, a participant may determine as the meeting is closing or after the meeting ends, to identify the entirety of the meeting as off-the-record. For example, the participant may find out or realize that the topic he or she discussed was confidential after the meeting ends. In such cases, the participant may retroactively identify the entirety of the meeting as off-the-record, thereby erasing his or her audio and video streams from the meeting record.

The host may have control to allow or disallow off-the-record time periods when requested by a participant. For example, following the above example embodiment, if the participant requests to make the entirety of the meeting off-the-record, the host may first receive a prompt of the participant's request. The host may accept or decline the participant's request. If the host accepts the participant's request, then the video conference provider 310 may erase the participant's audio and video streams from the recording. By informing the host of a participant's off-the-record request, the host is able to moderate how much and what content is removed from the record. In some embodiments, the host may select to defer the participant's request until after the meeting. This may allow the host time to review the requested off-the-record content and determine whether to allow removal of those portions of the recorded meeting. In such examples, once the participant makes the off-the-record request, the meeting recording may flag the requested off-the-record time period for review. If the host determines, after review of the off-the-record time period to approve the off-the-record request, then the corresponding audio and/or video streams may be removed from the meeting recording.

In some embodiments, the off-the-record request may be moderated for compliance purposes. For example, if recording of the meeting is mandatory for compliance purposes, then any off-the-record request made during the meeting may be denied. In response to the off-the-record request, a participant may receive a notification that the recording is being made for compliance purposes and as such, the off-the-record request is denied. Compliance monitoring of off-the-record requests may be done automatically by the video conference provider 310 or may be performed manually by the host or another participant.

Figure 6:
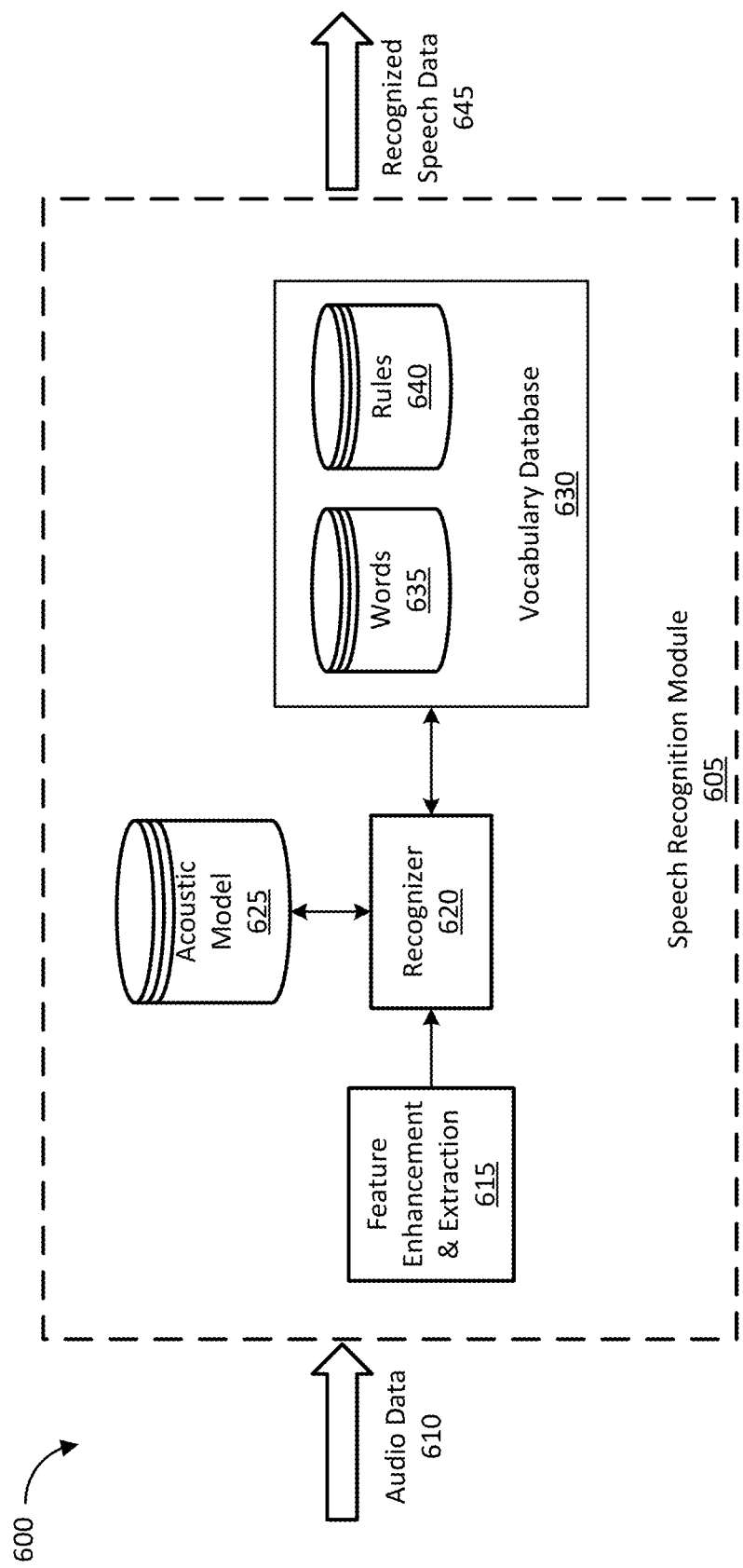
FIG. 6 illustrates an example speech recognition module that may be locally or remotely executed, according to an embodiment herein.

In some embodiments, an audible off-the-record indication may be used to invoke the off-the-record functionality. For example, the off-the-record functionality may be invoked by a participant saying one or more keywords, such as "off-the-record" or "confidential." In such embodiments, a speech recognition module may identify the invoking keywords from a participant's audio stream. Turning now to FIG. 6, an example speech recognition system 600 that may be locally or remotely executed is provided. For example, the speech recognition system 600 may be locally executed on a client device, such as the client device 340a, however, in other embodiments, the speech recognition system 600 may be cloud-based and/or remotely executed by a video conference provider, such as the video conference provider 310 or a third-party system.

The speech recognition system 600 may include a speech recognition module 605. The speech recognition module 605 may receive audio data 610. The audio data 610 may correspond to audio captured by the client device 340a, for example by a microphone. In other embodiments, the audio data 610 may be received from the video conference provider 310. The audio data 610 may be a recording of an audio stream or may be a transcript of the audio stream. The speech recognition module 605 may be or include a speech recognition system or model as known in the art. The following is an example speech recognition module following an example speech recognition process, however, it should be understood that other speech recognition modules or processes may be used.

Once the audio data 610 is received by the speech recognition module 605, the audio data 610 may be processed by a feature enhancement and extraction module 615. The feature enhancement and extraction module 615 may analyze the audio data for features corresponding to words and then enhance and extract any identified features. The identified features may correspond to audio waveforms present in human speech.

The speech recognition module 605 may also include a recognizer 620. The recognizer 620 may receive the identified features from the audio data 610. The recognizer 620 may employ an acoustic model 625 and a vocabulary database 630 to determine or associate the identified features in the audio data 610 to one or more words.

In an example embodiment, the acoustic model 625 may analyze the raw audio waveforms in the identified features and determine a corresponding phoneme for each waveform. In some embodiments, this is performed at the character or subword level. The vocabulary database 630 may be a language model. The vocabulary database 630 may include a rules database 640 and a word database 635. The rules database 640 may provide various rules for speech, allowing the recognizer to discard any association of identified features (e.g., audio waveforms) to phonemes that are improbable given the constraints of proper grammar and the topic of discussion. Once an appropriate mapping of the identified features to phonemes is generated, the recognizer 620 may determine words associated with the phonemes. The words may be based on the words database 635.

Once the phonemes are associated with respective words, recognized speech data 645 is generated. It should be understood that this process may be performed nearly instantaneously. For example, the speech recognition module 605 may generate the recognized speech data 645 during the meeting as the audio streams are being received by the video conference provider 310 or other system that is hosting the speech recognition system 600.

Figure 7:
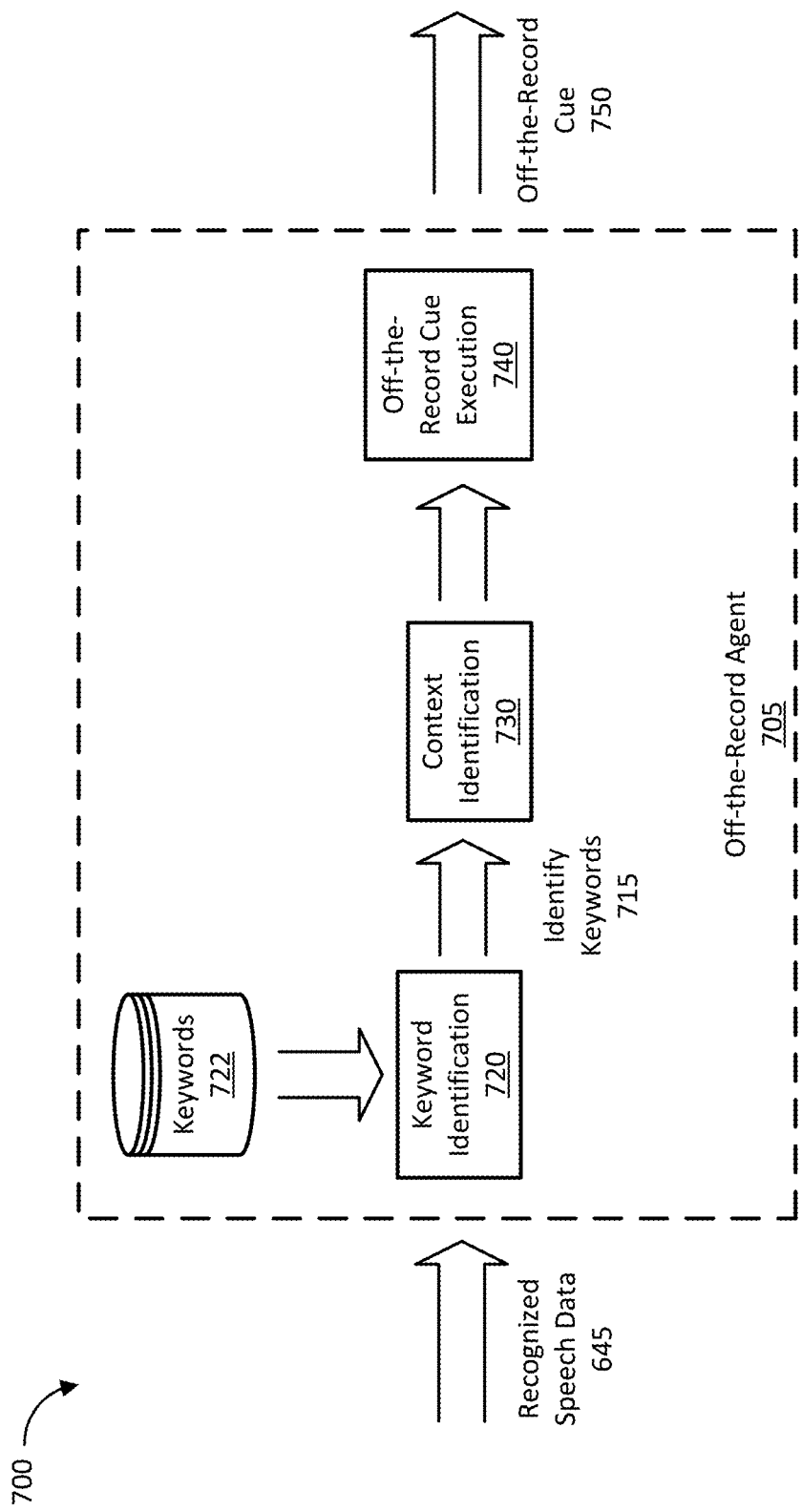
FIG. 7 illustrates an example off-the-record system 700 that may be locally or remotely executed, according to an embodiment herein.

The recognized speech 645 may be analyze by the speech recognition system 600 to identify keywords to invoke an off-the-record time period. Turning now to FIG. 7, an off-the-record system 700 is provided. The off-the-record system 700 may include an off-the-record agent 705 that is used to perform one or more of the off-the-record functions described herein. For example, in one case, the recognized speech 645 may be received from the speech recognition system 600.

The recognized speech 645 may be received by the keyword identification system 720. The keyword identification system 720 may identify one or more keywords in the recognized speech data 745. The database of known keywords 722 may be queried to identify any keywords in the stream of recognized speech data 645. Keywords in the keyword database 722 may be based on the participant for which the off-the-record function is being invoked. For example, if the off-the-record functionality is invoked for the client device 340a, then the keywords in the keyword database 722 may relate to or be based on participant A, who corresponds to the client device 340a. The keywords may include words relating to the identity of participant A or personally identifiable information about participant A, such as the first and last name of participant A. In some cases, the keywords may include an office or location of participant A. Other keywords may include the names of projects, areas, or topics that participant A is involved in. In some embodiments, keywords may include one or more emotion expressions, such as laughter.

The keywords in the keyword database 722 may be gathered from participant A or from the client device 340a. For example, upon enabling the off-the-record functionality, participant A may be prompted to input personally identifiable keywords that the off-the-record agent 705 should monitor the virtual meeting for (e.g., nickname). In other embodiments, the off-the-record agent 705 may receive some or all the keywords from the participant's profile with the video conference provider 310. In still other embodiments, the off-the-record agent 705 may gather keywords from applications on the client device 340a. If the off-the-record agent 705 has permission to search other applications on the client device 340a, the off-the-record agent 705 may gather keywords from folders, calendars, emails, or other applications running on the client device 340a.

It should be understood that a keyword may include more than one word. For example, "Project Alpha" may be a "keyword" as indicating that the phrase "Project Alpha" is an attention cue to participant A. Depending on various implementations, multi-word keywords may be treated as a single keyword or as multiple associated keywords. Further, a keyword may have multiple different forms. For example, a keyword may be a verb, which may be spelled different depending on context, e.g., it is conjugated differently depending on tense, subject, etc. Thus, a keyword may include variants of a base word, e.g., "look for," "looking for," and "looked for." In some examples each of these may be a distinct keyword, while in other examples, the variants may be associated with a base term, e.g., "look," that is used as the keyword. However, any suitable approach to recognizing keywords may be used.

If one or more keywords 715 is recognized, the off-the-record agent 705 then may identify a context 730 associated with the keyword 715. In this example, to identify a context, the off-the-record agent 705 may employ a trained machine learning ("ML") technique to semantically analyze the speech or transcript associated with the identified keyword 715 to determine additional related keywords and/or descriptors. To perform the analysis, the trained ML technique may be provided the keyword(s) and a predetermined number of words near the keyword, e.g., preceding and following the keyword(s), such as five to ten words preceding and following the keyword(s). Words such as articles (e.g., "a", "the") or prepositions such as "of" or "for" may be omitted from the word count in some examples.

The ML technique may receive the sequence of words and determine whether an off-the-record cue was intended. For example, if the participant says "Let's keep this confidential," the ML technique may semantically analyze the words and determine that the speaker is requesting to go off-the-record. Similarly, if the speaker says "Please keep this between you and me," the ML technique can semantically analyze and determine that the speaker is intending an off-the-record cue. Alternatively, if the speaker says "I liked the movie Spenser Confidential" the ML technique may determine that no off-the-record cue was intended and refrain from alerting the video conference provider 310 of an off-the-record cue.

While ML techniques may be employed in some examples, other examples of context identification 730 functionality may perform word searches for off-the-record cue words or phrases within a predetermined number of words from the identified keyword(s) 715. For example, considering the example above where the speaker says "Let's keep this confidential," the context identification may perform a search for certain words preceding "confidential", such as "Let's," "keep," etc. If one of those words is found preceding "confidential" by a predetermined number of words, the context identification 730 functionality may determine that the term "confidential" was meant as an off-the-record cue.

Since people may use jargon or colloquial terms to refer to particular actions, the context identification 730 functionality may normalize recognized words to specific meanings. For example, the terms "confidential," "private," "between you and me," "on the down low," etc. all refer to keeping information undisclosed. Thus, the context identification 730 functionality may map such terms to have a single meaning (e.g., private). Such mappings may be provided for multiple different phrases and corresponding terms. Similarly, synonyms or words related to keywords may also be identified.

Once the context identification 730 has identified the one or more keywords 715 and identified the context of the identified keywords 715, the off-the-record agent 705 may perform an off-the-record cue execution 740. The off-the-record agent 705 may determine, based on the identification of the keywords 715, and the context of the keywords, that participant A is requesting to be off-the-record. The off-the-record cue execution 840 may communicate with the video conferencing software to start an off-the-record time period. In some embodiments, participant A may receive a prompt indicating that the off-the-record cue 750 has been identified and ask if participant A would like to go off-the-record. In other embodiments, the off-the-record time period may automatically start upon identification of an off-the-record cue 750. The off-the-record agent 705 may transmit instructions to the video conferencing software, or initiate instructions within the video conferencing software if the off-the-record agent 705 is part of the video conferencing software, to provide a notification of the off-the-record cue 750 to the participant.

In some embodiments, the off-the-record system 700 may be used to generate a transcript and/or edit a transcript of the meeting recording. When a participant is off-the-record, a corresponding transcript will not include any transcription of the audio streams during the off-the-record time period. As noted above, in some embodiments, this may occur retroactively. In such cases, the transcript may be analyzed and any transcription corresponding to the participant's audio stream during the off-the-record time period may be removed. In still further embodiments, such as those where the participant request to be anonymous during the meeting and on the transcription, the off-the-record system 700 may identify and remove any personally identifiable information corresponding to the participant. For example, the keyword identification 720 and the context identification 730 may be used to identify keywords and context within a transcript that correspond to personally identifiable information of the participant A. Once identified, the off-the-record system 700 may remove the personally identifiable content from the transcript.

Figure 8:
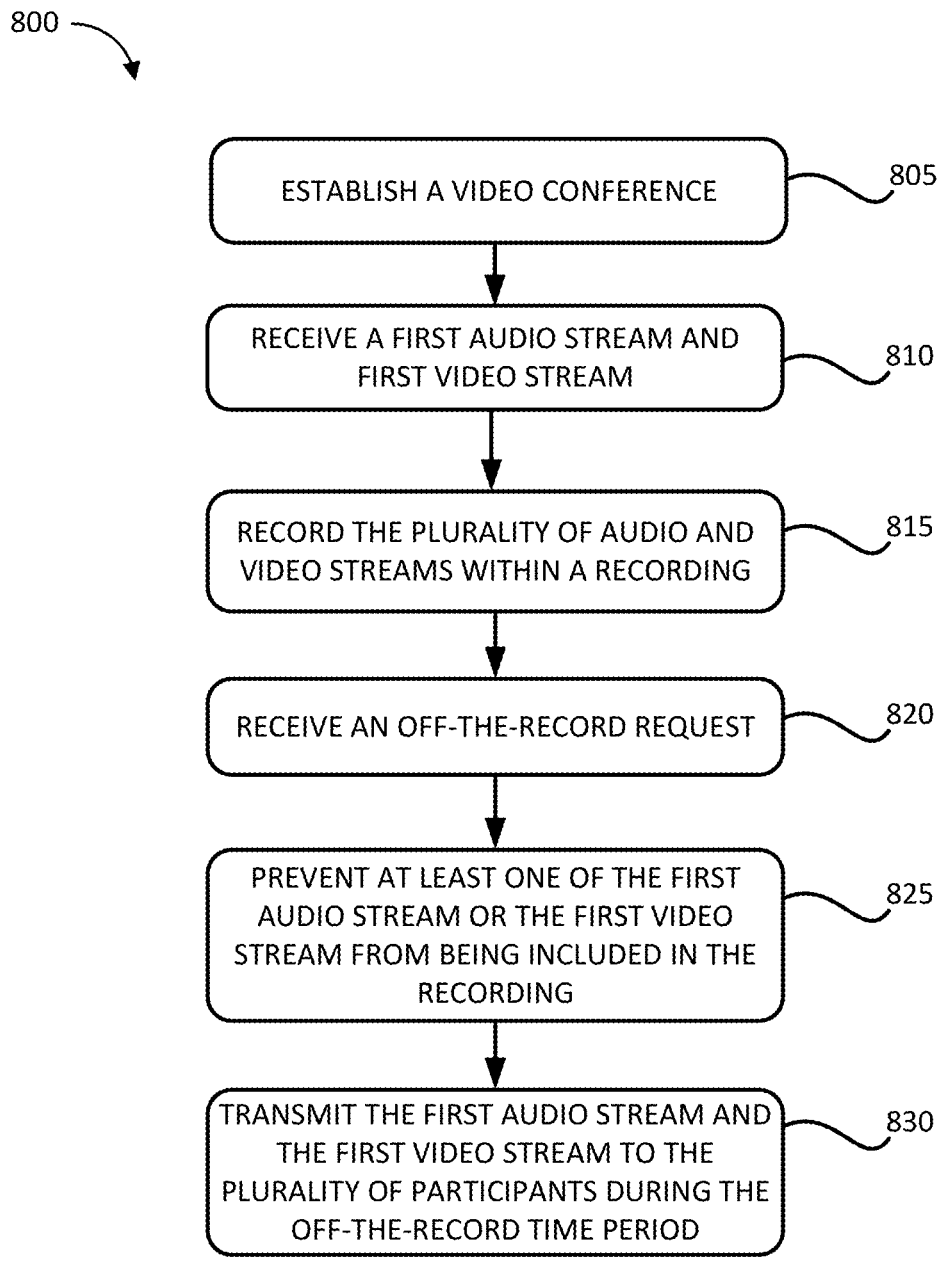
FIG. 8 illustrates an exemplary method for providing off-the-record functionality during a virtual meeting, according to an embodiment herein.

Referring now to FIG. 8, a flowchart of an example method 800 for providing an off-the-record button during a virtual meeting is provided. The description of the method 800 in FIG. 8 will be made with reference to FIGS. 3-6, however any suitable system according to this disclosure may be used, such as the example systems 100 and 200, shown in FIGS. 1 and 2.

The method 800 provides a technique for providing off-the-record functionality during a virtual meeting according to an example embodiment provided herein. The method 800 may include step 805. At step 805, a video conference provider, such as the video conference provider 310, may establish a video conference. The video conference may include a plurality of participants, such as the participants associated with the participant client devices 340a-m. Each participant of the plurality of participants may exchange a plurality of audio and video streams via the video conference.

The method 800 may include step 810. At step 810, a first audio stream and a first video stream from a first client device may be received. For example, the video conference provider 310 may receive a first audio stream and a first video stream from the participant client device 340a. The first client device may be associated with one of the plurality of participants in the video conference.

At some point during the video conference, one of the plurality of participants may request to record the video conference. At step 815, the method 800 may include recording, responsive to an indication from one of the plurality of participants, the plurality of audio and video streams within a recording. The method 800 may also include step 820, at which an off-the-record request to begin an off-the-record time period is received from the first client device. For example, a participant associated with the first client device may select the off-the-record button/selection 420. In another example, the off-the-record request may include identifying, based on the first audio stream, one or more keywords indicating the off-the-record request. For example, the video conference provider 310 or another third party, may perform speech recognition on the first audio stream and determine, based on the speech recognition, the one or more keywords indicating the off-the-record request.

At step 825, the method 800 may include preventing at least one of the first audio stream or the first video stream from being included in the recording. This step may be made responsive to the off-the-record request. In some embodiments, both the first audio stream and the first video stream may be prevented from being included in the recording. In an example embodiment, the method 800 may include modifying, based on the off-the-record request, the first video stream during the off-the-record time period. For example, one or more objects in the first video stream may be obfuscated during the off-the-record time period. This may include blurring a face of a first participant associated with the first client device in the first video stream during the off-the-record time period.

The method 800 may also include step 830. At 830, the first audio stream and the first video stream may be transmitted to the plurality of participants during the off-the-record time period. For example, the video conference provider 310 may continue to transmit the first audio stream and the first video stream to the plurality of participants. As noted above, even though the meeting is being recorded and the first audio stream and the first video stream are transmitted to the plurality of participants during the video conference, the first audio stream and the first video stream may not be included in the recording during the off-the-record time period.

Figure 9:
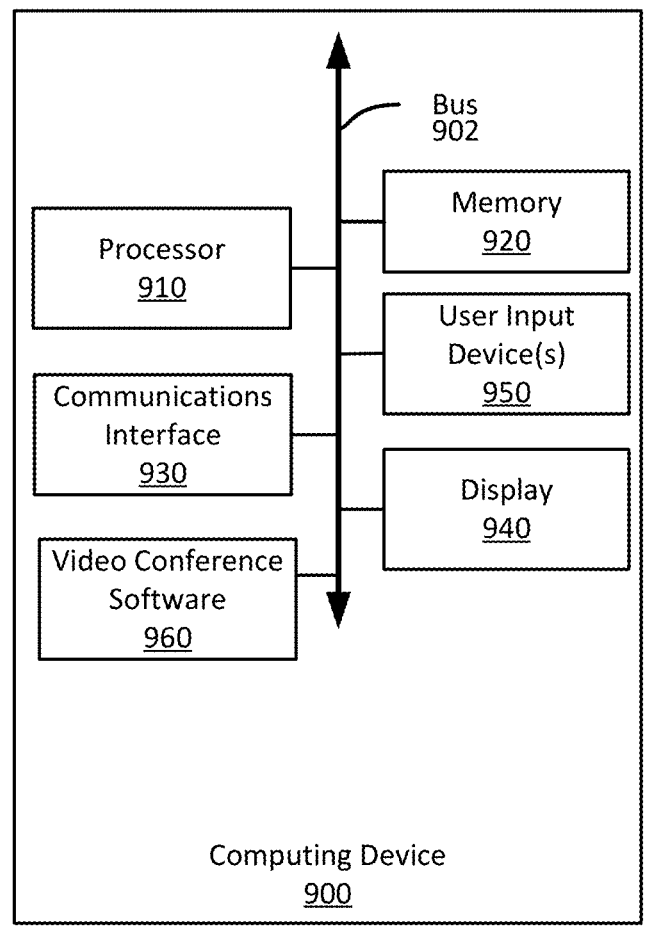
FIG. 9 shows an example computing device suitable for providing off-the-record functionality during a virtual meeting, according to this disclosure.

Referring now to FIG. 9, FIG. 9 shows an example computing device 900 suitable for use in example systems or methods for providing an off-the-record button during a virtual meeting. The example computing device 900 includes a processor 910 which is in communication with the memory 920 and other components of the computing device 900 using one or more communications buses 902. The processor 910 is configured to execute processor-executable instructions stored in the memory 920 to perform one or more methods for providing an off-the-record button during a virtual meeting, such as part or all of the example method 800, described above with respect to FIG. 8. The computing device, in this example, also includes one or more user input devices 950, such as a keyboard, mouse, touchscreen, video input device (e.g., one or more cameras), microphone, etc., to accept user input. The computing device 900 also includes a display 940 to provide visual output to a user.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: establish a video conference having a plurality of participants, each participant of the plurality of participants exchanging a plurality of audio or video streams via the video conference; receive, from a first client device associated with one of the plurality of participants, at least one of a first audio stream or a first video stream of the plurality of audio or video streams; record, responsive to an indication from one of the plurality of participants, the plurality of audio or video streams within a recording; receive, from the first client device, an off-the-record request to begin an off-the-record time period; in response to the off-the-record request, prevent the at least one of the first audio stream or the first video stream from being included in the recording; and transmit, to the plurality of participants, the at least one of the first audio stream or the first video stream during the off-the-record time period.

Example 2 is the system of any previous or subsequent example, the processor is configured to execute further processor-executable instructions stored in the non-transitory computer-readable medium to: determine an end time for the off-the-record time period; and resume recording of the at least one of the first audio stream or the first video stream based on the end time of the off-the-record time period.

Example 3 is the system of any previous or subsequent example, wherein the processor-executable instructions to prevent the at least one of the first audio stream or the first video stream from being included in the recording further cause the processor to execute further processor-executable instructions stored in the non-transitory computer-readable medium to: terminate recording of the first audio stream from the first client device during the off-the-record time period.

Example 4 is the system of any previous or subsequent example, wherein the processor-executable instructions to prevent the at least one of the first audio stream or the first video stream from being included in the recording further cause the processor to execute further processor-executable instructions stored in the non-transitory computer-readable medium to: record the at least one of the first audio stream or the first video stream as part of the recording during a first time period; and responsive to the off-the-record request, erase the at least one of the first audio stream or the first video stream from the recording during the off-the-record time period, wherein the off-the-record time period occurs during the first time period.

Example 5 is the system of any previous or subsequent example, wherein the processor is configured to execute further processor-executable instructions stored in the non-transitory computer-readable medium to: erase, responsive to the off-the-record request, the at least one of the first audio stream or the first video stream from the recording.

Example 6 is the system of any previous or subsequent example, wherein the processor is configured to execute further processor-executable instructions stored in the non-transitory computer-readable medium to: store the recording as a stored recording, wherein the stored recording does not include the at least one of the first audio stream or the first video stream during the off-the-record time period.

Example 7 is the system of any previous or subsequent example, wherein the processor is configured to execute further processor-executable instructions stored in the non-transitory computer-readable medium to: generate a transcript of the plurality of audio streams from the video conference; and prevent transcription of the first audio stream during the off-the-record time period from being part of the generated transcript.

Example 8 is a method comprising: establishing, by a video conference provider, a video conference having a plurality of participants, each participant of the plurality of participants exchanging a plurality of audio or video streams via the video conference; receiving, from a first client device associated with one of the plurality of participants, at least a first audio stream or a first video stream of the plurality of audio or video streams; recording, by the video conference provider, responsive to an indication from one of the plurality of participants, the plurality of audio or video streams within a recording; receiving, from a first client device, an off-the-record request to begin an off-the-record time period; in response to the off-the-record request, preventing the at least one of the first audio stream or the first video stream from being included in the recording; and transmitting, by the video conference provider, the at least one of the first audio stream or the first video stream to the plurality of participants during the off-the-record time period.

Example 9 is the method of any previous or subsequent example, wherein the off-the-record request comprises a user-initiated selection to go off-the-record.

Example 10 is the method of any previous or subsequent example, wherein receiving, from the first client device, the off-the-record request, comprises: identifying, based on the first audio stream, one or more keywords indicating the off-the-record request.

Example 11 is the method of any previous or subsequent example, wherein identifying, based on the first audio stream, the one or more keywords indicating the off-the-record request comprises: performing, by the video conference provider, speech recognition on the first audio stream; and determining, based on the speech recognition, the one or more keywords indicating the off-the-record request.

Example 12 is the method of any previous or subsequent example, further comprising: modifying, based on the off-the-record request, the at least one of the first audio stream or the first video stream during the off-the-record time period.

Example 13 is the method of any previous or subsequent example, wherein modifying, based on the off-the-record request, the first video stream during the off-the-record time period comprises: obfuscating one or more objects in the first video stream during the off-the-record time period.

Example 14 is the method of any previous or subsequent example, wherein obfuscating one or more objects in the first video stream during the off-the-record time period comprises: blurring a face of a first participant associated with the first client device in first video stream during the off-the-record time period.

Example 15 is a non-transitory computer-readable medium comprising processor-executable instructions configured to cause one or more processors to: establish a video conference having a plurality of participants, each participant of the plurality of participants exchanging a plurality audio or video streams via the video conference; receive, from a first client device associated with one of the plurality of participants, at least a first audio stream or a first video stream of the plurality of audio or video streams; record, responsive to an indication from one of the plurality of participants, the plurality of audio or video streams within a recording; receive, from the first client device, an off-the-record request to begin an off-the-record time period; in response to the off-the-record request, prevent the at least one of the first audio stream or the first video stream from being included in the recording; and transmit, to the plurality of participants, the at the first audio stream or the first video stream during the off-the-record time period.

Example 16 is the non-transitory computer-readable medium of any previous or subsequent example, wherein the processor is configured to execute further processor-executable instructions stored in the non-transitory computer-readable medium to: receive, from a second client device associated with one of the plurality of participants, a second audio stream and a second video stream of the plurality of audio or video streams; receive, from the second client device, a second off-the-record request to begin a second off-the-record time period; and in response to the second off-the-record request, prevent at least one of the second audio stream or the second video stream from being included in the recording.

Example 17 is the non-transitory computer-readable medium of any previous or subsequent example, wherein the processor is configured to execute further processor-executable instructions stored in the non-transitory computer-readable medium to: receive, from a second client device associated with one of the plurality of participants, a second audio stream and a second video stream of the plurality of audio or video streams; receive, from the second client device, a second off-the-record request to begin a second off-the-record time period; determine, based on the second off-the-record time period, a denial of the second off-the-record request; transmit, to the second client device, the denial of the second off-the-record request; and continue recording the second audio stream and the second video stream.

Example 18 is the non-transitory computer-readable medium of any previous or subsequent example, wherein the processor is configured to execute further processor-executable instructions stored in the non-transitory computer-readable medium to: receive, from a second client device associated with one of the plurality of participants, a second audio stream and a second video stream of the plurality of audio or video streams; receive, from the second client device, a second off-the-record request to begin a second off-the-record time period; provide, to the second client device, an instant replay of the recording during the second off-the-record time period; receive, from the second client device, an indication to erase the at least one of the second audio stream or the second video stream from the recording during the second off-the-record time period; and modify the at least one of the second audio stream or the second video stream during the recording the second off-the-record time period.

Example 19 is the non-transitory computer-readable medium of any previous or subsequent example, wherein the processor is configured to execute further processor-executable instructions stored in the non-transitory computer-readable medium to: in response to the off-the-record request, provide, to the first client device, a quick-replay prompt of the recording for a time duration prior to a time that the off-the-record request was made; receive, from the first client device, an indication of a start time for the off-the-record time period and an end time for the off-the-record time period; and modify the least one of the first audio stream or the first video stream from being included in the recording during the off-the-record time period.

Example 20 is the non-transitory computer-readable medium of any previous or subsequent example, wherein: the processor-executable instructions to prevent the at least one of the first audio stream or the first video stream from being included in the recording comprises removing the at least one of the first audio stream or the first video stream from the recording during the off-the-record time period; and the processor is configured to execute further processor-executable instructions stored in the non-transitory computer-readable medium to: store the recording as a stored recording, wherein the stored recording does not include the at least one of the first audio stream or the first video stream during the off-the-record time period.

That which is claimed is:

1. A system comprising:
a non-transitory computer-readable medium;
a communications interface; and
a processor communicatively coupled to the non-transitory computer-readable medium and the communications interface, the processor configured to execute processor-executable instructions stored in the non-transitory computer-readable medium to:
establish a video conference having a plurality of participants, each participant of the plurality of participants exchanging a plurality of audio or video streams via the video conference;
receive, from a first client device associated with one of the plurality of participants, at least one of a first audio stream or a first video stream of the plurality of audio or video streams;
record, responsive to an indication from one of the plurality of participants, the plurality of audio or video streams within a recording;
receive, from the first client device, an off-the-record request to begin an off-the-record time period;
in response to the off-the-record request, prevent the at least one of the first audio stream or the first video stream from being included in the recording; and
transmit, to the plurality of participants, the at least one of the first audio stream or the first video stream during the off-the-record time period.

2. The system of claim 1, the processor is configured to execute further processor-executable instructions stored in the non-transitory computer-readable medium to:
determine an end time for the off-the-record time period; and
resume recording of the at least one of the first audio stream or the first video stream based on the end time of the off-the-record time period.

3. The system of claim 1, wherein the processor-executable instructions to prevent the at least one of the first audio stream or the first video stream from being included in the recording further cause the processor to execute further processor-executable instructions stored in the non-transitory computer-readable medium to:
terminate recording of the first audio stream from the first client device during the off-the-record time period.

4. The system of claim 1, wherein the processor-executable instructions to prevent the at least one of the first audio stream or the first video stream from being included in the recording further cause the processor to execute further processor-executable instructions stored in the non-transitory computer-readable medium to:
record the at least one of the first audio stream or the first video stream as part of the recording during a first time period; and
responsive to the off-the-record request, erase the at least one of the first audio stream or the first video stream from the recording during the off-the-record time period, wherein the off-the-record time period occurs during the first time period.

5. The system of claim 1, wherein the processor is configured to execute further processor-executable instructions stored in the non-transitory computer-readable medium to:

erase, responsive to the off-the-record request, the at least one of the first audio stream or the first video stream from the recording.

6. The system of claim 1, wherein the processor is configured to execute further processor-executable instructions stored in the non-transitory computer-readable medium to:
store the recording as a stored recording, wherein the stored recording does not include the at least one of the first audio stream or the first video stream during the off-the-record time period.

7. The system of claim 1, wherein the processor is configured to execute further processor-executable instructions stored in the non-transitory computer-readable medium to:
generate a transcript of the plurality of audio streams from the video conference; and
prevent transcription of the first audio stream during the off-the-record time period from being part of the generated transcript.

8. A method comprising:
establishing, by a video conference provider, a video conference having a plurality of participants, each participant of the plurality of participants exchanging a plurality of audio or video streams via the video conference;
receiving, from a first client device associated with one of the plurality of participants, at least a first audio stream or a first video stream of the plurality of audio or video streams;
recording, by the video conference provider, responsive to an indication from one of the plurality of participants, the plurality of audio or video streams within a recording;
receiving, from a first client device, an off-the-record request to begin an off-the-record time period;
in response to the off-the-record request, preventing the at least one of the first audio stream or the first video stream from being included in the recording; and
transmitting, by the video conference provider, the at least one of the first audio stream or the first video stream to the plurality of participants during the off-the-record time period.

9. The method of claim 8, wherein the off-the-record request comprises a user-initiated selection to go off-the-record.

10. The method of claim 8, wherein receiving, from the first client device, the off-the-record request, comprises:
identifying, based on the first audio stream, one or more keywords indicating the off-the-record request.

11. The method of claim 10, wherein identifying, based on the first audio stream, the one or more keywords indicating the off-the-record request comprises:
performing, by the video conference provider, speech recognition on the first audio stream; and
determining, based on the speech recognition, the one or more keywords indicating the off-the-record request.

12. The method of claim 8, further comprising:
modifying, based on the off-the-record request, the at least one of the first audio stream or the first video stream during the off-the-record time period.

13. The method of claim 12, wherein modifying, based on the off-the-record request, the first video stream during the off-the-record time period comprises:
obfuscating one or more objects in the first video stream during the off-the-record time period.

14. The method of claim 13, wherein obfuscating one or more objects in the first video stream during the off-the-record time period comprises:
blurring a face of a first participant associated with the first client device in first video stream during the off-the-record time period.

15. A non-transitory computer-readable medium comprising processor-executable instructions configured to cause one or more processors to:
establish a video conference having a plurality of participants, each participant of the plurality of participants exchanging a plurality audio or video streams via the video conference;
receive, from a first client device associated with one of the plurality of participants, at least a first audio stream or a first video stream of the plurality of audio or video streams;
record, responsive to an indication from one of the plurality of participants, the plurality of audio or video streams within a recording;
receive, from the first client device, an off-the-record request to begin an off-the-record time period;
in response to the off-the-record request, prevent the at least one of the first audio stream or the first video stream from being included in the recording; and
transmit, to the plurality of participants, the at least one of the first audio stream or the first video stream during the off-the-record time period.

16. The non-transitory computer-readable medium of claim 15, wherein the processor is configured to execute further processor-executable instructions stored in the non-transitory computer-readable medium to:
receive, from a second client device associated with one of the plurality of participants, a second audio stream and a second video stream of the plurality of audio or video streams;
receive, from the second client device, a second off-the-record request to begin a second off-the-record time period; and
in response to the second off-the-record request, prevent at least one of the second audio stream or the second video stream from being included in the recording.

17. The non-transitory computer-readable medium of claim 15, wherein the processor is configured to execute further processor-executable instructions stored in the non-transitory computer-readable medium to:
receive, from a second client device associated with one of the plurality of participants, a second audio stream and a second video stream of the plurality of audio or video streams;
receive, from the second client device, a second off-the-record request to begin a second off-the-record time period;
determine, based on the second off-the-record time period, a denial of the second off-the-record request;
transmit, to the second client device, the denial of the second off-the-record request; and
continue recording the second audio stream and the second video stream.

18. The non-transitory computer-readable medium of claim 15, wherein the processor is configured to execute further processor-executable instructions stored in the non-transitory computer-readable medium to:
receive, from a second client device associated with one of the plurality of participants, a second audio stream and a second video stream of the plurality of audio or video streams;

receive, from the second client device, a second off-the-record request to begin a second off-the-record time period;

provide, to the second client device, an instant replay of the recording during the second off-the-record time period;

receive, from the second client device, an indication to erase the at least one of the second audio stream or the second video stream from the recording during the second off-the-record time period; and modify the at least one of the second audio stream or the second video stream during the recording the second off-the-record time period.

19. The non-transitory computer-readable medium of claim 15, wherein the processor is configured to execute further processor-executable instructions stored in the non-transitory computer-readable medium to:

in response to the off-the-record request, provide, to the first client device, a quick-replay prompt of the recording for a time duration prior to a time that the off-the-record request was made;

receive, from the first client device, an indication of a start time for the off-the-record time period and an end time for the off-the-record time period; and modify the least one of the first audio stream or the first video stream from being included in the recording during the off-the-record time period.

20. The non-transitory computer-readable medium of claim 15, wherein:

the processor-executable instructions to prevent the at least one of the first audio stream or the first video stream from being included in the recording comprises removing the at least one of the first audio stream or the first video stream from the recording during the off-the-record time period; and the processor is configured to execute further processor-executable instructions stored in the non-transitory computer-readable medium to:

store the recording as a stored recording, wherein the stored recording does not include the at least one of the first audio stream or the first video stream during the off-the-record time period.

* * * * *